J. FRITSCHE.
BEAN VINE CUTTER.
APPLICATION FILED JUNE 20, 1918.
1,309,885.
Patented July 15, 1919.
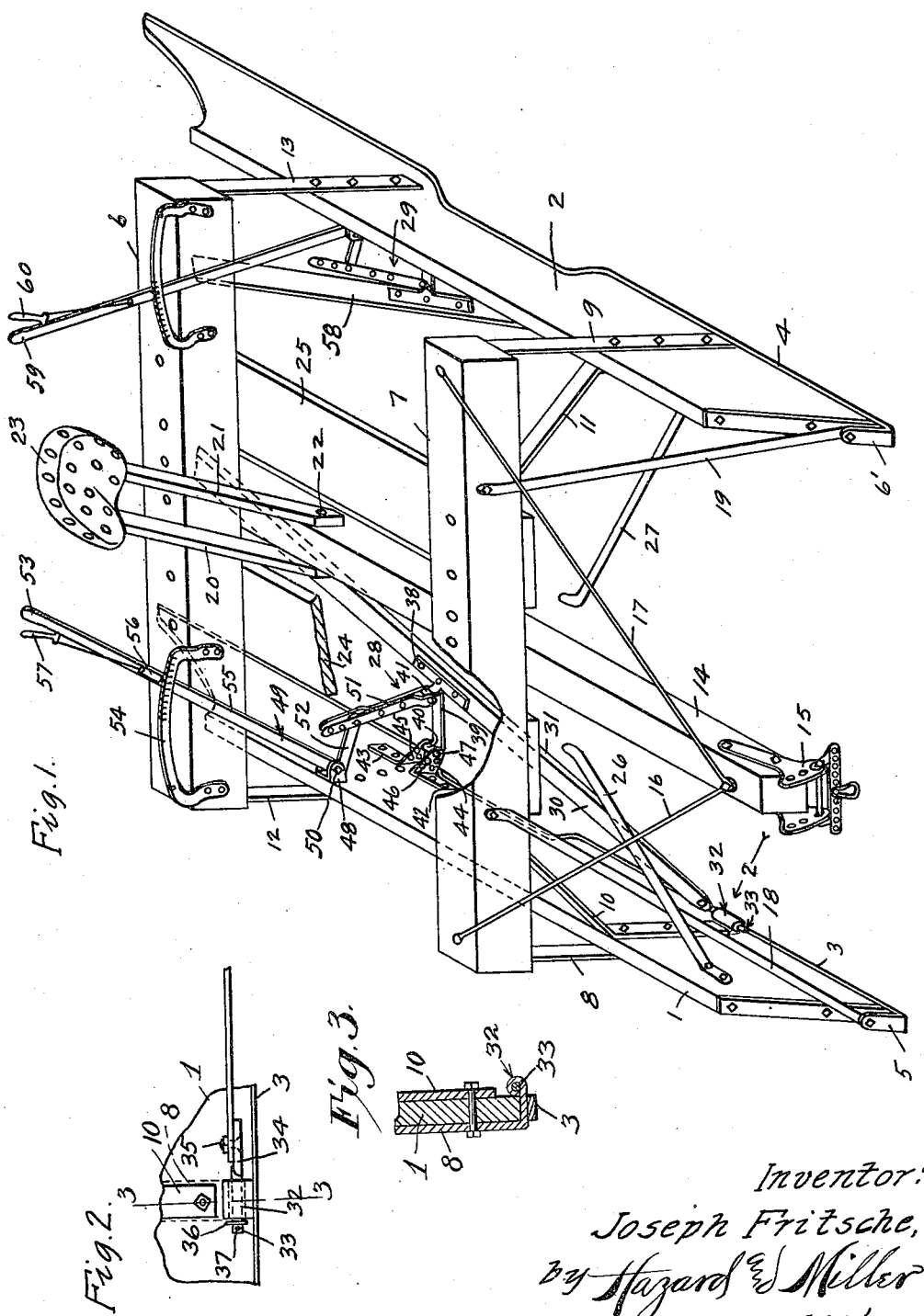
Inventor:
Joseph Fritsche,
by Hazard & Miller
Attys.

UNITED STATES PATENT OFFICE.

JOSEPH FRITSCHE, OF PUENTE, CALIFORNIA.

BEAN-VINE CUTTER.

1,309,885.      Specification of Letters Patent.      Patented July 15, 1919.

Application filed June 20, 1918. Serial No. 241,060.

*To all whom it may concern:*

Be it known that I, JOSEPH FRITSCHE, a citizen of the United States, residing at Puente, in the county of Los Angeles and State of California, have invented new and useful Improvements in Bean-Vine Cutters, of which the following is a specification.

My invention relates to bean harvesters and consists in the novel features herein shown, described and claimed.

My present invention is a modification of the construction shown, described and claimed in the patent issued to me January 1, 1918, No. 1,252,377.

Figure 1 is a perspective of a bean harvester embodying the principles of my invention.

Fig. 2 is a fragmentary detail elevation of the swivel indicated by the arrow 2 in Fig. 1.

Fig. 3 is a fragmentary sectional detail on the line 3—3 of Fig. 2.

The runners 1 and 2 are provided with strap iron shoes 3 and 4 upon their lower edges, the forward ends 5 and 6' of the shoes being turned upwardly. The cross beams 6 and 7 are square timbers long enough to space the runners 1 and 2 the desired distance apart. Strap posts 8 and 9 are secured to the outer faces of the runners 1 and 2 near their forward ends and extend upwardly some distance above the upper edges of the runners. Braces 10 and 11 are secured to the inner faces of the runners and extend upwardly and inwardly, and the cross beam 7 is secured to the upper ends of the strap posts 8 and 9 and to the upper ends of the braces 10 and 11. In a like manner posts 12 and 13 extend upwardly from near the rear ends of the runners 1 and 2 and the cross beam 6 is mounted upon the upper ends of the posts 12 and 13. A tongue 14 is secured to the lower faces of the cross beams 6 and 7 half way between the runners 1 and 2, a clevis construction 15 is secured to the forward end of the tongue 14, and braces 16 and 17 connect the forward end of the tongue 14 to the outer ends of the cross beam 7. Braces 18 and 19 connect the ends 5 and 6 of the shoes to the cross beam 7. Seat bars 20 and 21 are connected to the tongue 14 by a pivot 22, said pivot 22 being located between the cross beams 6 and 7, so that the bars 20 and 21 will extend upwardly and backwardly and rest upon the cross beam 6 when the seat 23 is in use; said seat 23 being mounted upon the upper rear ends of the bars 20 and 21; and so that the seat 23 may be swung upwardly and forwardly to rest on the tongue 14 or the beam 7 when the seat is not desired for use. Platform boards 24 and 25 are secured to the lower faces of the cross beams 6 and 7, one on each side of the tongue 14, the upper faces of the boards 24 and 25 being on a level with the upper face of the tongue. Deflector bars 26 and 27 are secured at their forward ends to the inner faces of the runners 1 and 2 and said bars extend inwardly and backwardly a considerable distance.

The runners 1 and 2 are set wide enough apart to straddle two rows of beans as they are ordinarily planted, and a cutting mechanism 28 is carried by the runner 1 for cutting one row of beans and a similar cutting mechanism 29 is carried by the runner 2 for cutting the other row of beans.

The details of the cutting mechanism 28 are as follows: The cutter bar 30 is a straight piece of steel having a beveled inner cutting edge 31 extending from end to end. A bearing 32 is formed upon the lower end of the post 8, the lower end of the post being bent at right angles and recessed into the lower edge of the runner 1, a pintle 33 is rotatably mounted in the bearing 32, a flat plate 34 is formed upon the rear end of the pintle 33, and the forward end of the cutter bar 30 is connected to the plate 34 by a bolt 35, so that the rear end of the cutter bar may swing to and from the runner 1 and so that the rear end of the cutter bar may swing up and down. A washer 36 is placed upon the pintle 33 against the bearing 32 and a cutter 37 is inserted through the pintle in front of the washer. An attaching plate 38 is secured to the cutter bar 30 near its center, an arm 39 extends outwardly from the plate 38 on a level with the cutter bar 30, a bearing 40 is formed at the outer end of the arm 39, and a bearing 41 is formed at the inner end of the arm. Attaching plates 42 and 43 are secured to the inner face of the runner 1, ears 44 and 45 extend inwardly from the plates 42 and 43, and the bearing 40 fits between these ears. The ears 44 and 45 are provided with a plurality of perforations 46 and a bolt 47 is removably inserted through the perforations 46 and the bearing 40 so that the bearing 40 may be adjusted to and from the runner 1 and up and down by moving the bolt 47 to the desired perforations. A bracket 48 is secured to the inner face of the runner 1 near its upper edge, a bell crank lever 49 is connected to the bracket 48 by the pivot 50, and a link 51 connects the short arm 52 of the lever to the bearing 41. The long arm of the lever 49 extends upwardly beyond the top of the cross beam 6 and has a handle 53 at its upper end. A toothed sector 54 is secured to the cross beam 6 so that the long arm 55 of the bell crank lever extends between the cross beam 6 and the sector. The latch 56 carried by the arm 55 is operated by the handle 57 and engages the teeth upon the toothed sector 54, so that by manipulating the handles 53 and 57 and swinging the arm 55 inwardly or outwardly the cutter bar 30 is raised or lowered and the edge 31 tilted, as required to properly approach and engage the row of beans and sever the beans from the ground. The bar 26 deflects the upper parts of the bean vines inwardly so that when the bean vines are severed from the ground the two rows of vines are left in a windrow behind the harvester.

In a like manner the cutter bar 58 is connected to the inner face of the runner 2 and controlled by the handle 59 corresponding to the handle 53 and the handle 60 corresponding to the handle 57.

Various changes may be made in the details of construction without departing from the spirit of my invention as claimed.

I claim:

1. In a bean harvester, a runner, a bearing at the inner side and lower edge of the runner and near its forward end, a pintle rotatably mounted in the bearing parallel with the runner, a cutter bar pivotally connected to the rear end of the pintle and extending inwardly and backwardly to near the rear end of the runner, an arm rigidly connected to the cutter bar and extending toward the runner, means for adjustably and pivotally connecting the arm to the runner, a bell-crank lever pivotally connected to the runner to swing transversely of the runner, a link connecting the lower end of the bell crank lever to the cutter bar, and a handle, latch and sector construction for adjusting the position of the bell crank lever to adjust the position of the cutter bar.

2. In a bean harvester, a runner, a bearing at the inner side and lower edge of the runner and near its forward end, a pintle rotatably mounted in the bearing parallel with the runner, a cutter bar pivotally connected to the rear end of the pintle and extending inwardly and backwardly to near the rear end of the runner, an arm rigidly connected to the cutter bar and extending toward the runner, attaching plates secured to the inner face of the runner, ears extending inwardly from the attaching plates, said ears being provided with a plurality of alined perforations, a bearing at the inner end of the arm fitting between the ears, a bolt inserted through the ears and through the bearing so that by moving the bolt the bearing may be adjusted, a bell crank lever pivotally connected to the runner to swing crosswise of the runner, a link connecting the lower end of the bell crank lever to the cutter bar, a handle upon the upper end of the bell crank lever and a latch and sector for adjusting the position of the bell crank lever to adjust the position of the cutter bar.

In testimony whereof I have signed my name to this specification.

JOSEPH FRITSCHE.

Copies of this patent may be obtained for five cents each, by addressing the "Commissioner of Patents, Washington, D. C."